UNITED STATES PATENT OFFICE.

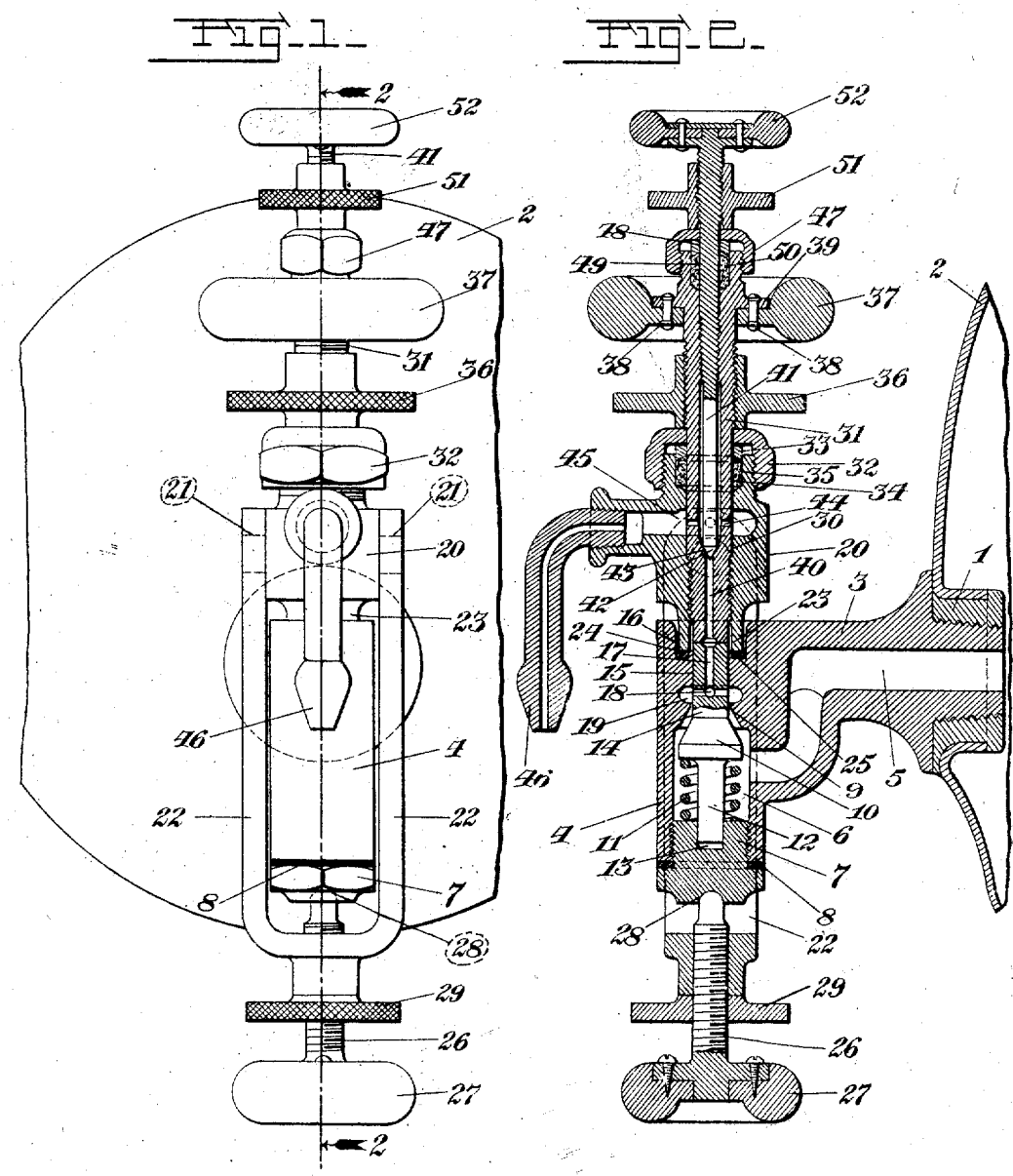

CLARENCE DE WITT LUKENS, OF ST. LOUIS, MISSOURI, ASSIGNOR OF ONE-HALF TO DAVID L. SOLOMAN, OF ST. LOUIS, MISSOURI.

VALVE.

987,002.

Specification of Letters Patent. Patented Mar. 14, 1911.

Application filed March 21, 1910. Serial No. 550,559.

*To all whom it may concern:*

Be it known that I, CLARENCE DEWITT LUKENS, a citizen of the United States, residing at the city of St. Louis, State of Missouri, have invented certain new and useful Improvements in Valves, of which the following is a specification, reference being had therein to the accompanying drawings.

This invention relates to valves, and has for its object to provide a valve that is particularly intended to be used to control the discharge of acetylene or other gas from a reservoir in which the gas is stored or generated for the purpose of supplying the lamps of an automobile, railway coach, locomotive, etc.

Another object of this invention is to provide locking means for the operating parts of the valve in order to maintain a uniform discharge of the gas from the reservoir and, also, to prevent the operating parts from shaking loose by the jarring of the automobile.

In the drawings forming part of this specification, in which like numbers of reference denote like parts wherever they occur, Figure 1 is an end elevation of a reservoir having a valve embodying this invention attached thereto; and Fig. 2 is a sectional view on the line 2—2, Fig. 1.

A bushing 1 that is secured by any suitable means in an opening in a reservoir 2 is screw-threaded internally to receive the screw-threaded end of neck 3 of the valve casing 4. Said neck is provided with a passage 5 which communicates with the interior of reservoir 2 and, also, with the valve-chamber 6 in said casing. A screw-threaded plug 7 closes one end of chamber 6 and presses a packing washer 8 firmly against the lower end of casing 4 in order to prevent the gas from escaping from said chamber. The other end of chamber 6 is tapered to form a seat 9 for a valve 10 that is normally held against said seat by means of a spring 11. A projection 12 borne by said valve extends into an aperture 13 in plug 7 in order to guide said valve in its movement toward and away from said seat. The stem 14 of valve 10 passes through opening 15 in casing 4 and projects into the interior of a cup 16 in the upper end of said casing. A passage 17 extends longitudinally in stem 14 and terminates in apertures 18 which pass transversely through said stem. Said apertures 18 communicate with chamber 19 within casing 4, and, when valve 10 is moved from engagement with seat 9, the gas in chamber 6 passes into chamber 19 from which it flows through apertures 18 that deliver it to passage 17.

A member 20 is provided with a pair of trunnions 21 that project from opposite sides of said member into openings in the sides of a U-shaped yoke 22, which partly encircles casing 4. A sleeve 23 borne by member 20 extends into the interior of cup 16 and encircles the upper end of valve-stem 14. Said sleeve presses a gasket 24 in an annular groove 25 in cup 16 in order to prevent the gas from leaking out of said cup, said gasket being formed of lead or any other suitable material. A screw stud 26 bearing a hand-wheel 27 passes through a screw-threaded opening in the bottom of yoke 22 and seats in a depression 28 in plug 7 in order to hold sleeve 23 in cup 16 and against gasket 24. A lock-nut 29 on stud 26 prevents the same from being shaken loose by the jarring of the automobile or other conveyance to which reservoir 2 is attached. A portion of opening 30 in member 20 is screw-threaded to receive a screw-threaded portion of stem 31 that passes through said opening. The lower end of stem 31 projects into the interior of sleeve 23 and abuts the upper end of valve-stem 14, and, when stem 31 is turned to move toward stem 14, said stem 14 pushes valve 10 away from seat 9 in order to allow the gas to pass from chamber 6 into chamber 19. A cap 32 borne by member 20 encircles stem 31 and presses a packing-ring 33 against packing 34 within stuffing-box 35 in said member in order to prevent the gas from leaking around said stem. A portion of stem 31 is screw-threaded to receive a lock-nut 36 that presses against cap 32 and holds stem 31 in any desired position to maintain a uniform flow of the gas from chamber 6 into chamber 19. A hand-wheel 37 is fastened by means of rivets 38 or the like to flange 39 of stem 31 for the purpose of turning said stem.

A passage 40 extends longitudinally through stem 31 and registers with passage 17 in stem 14. The upper portion of passage 40 is screw-threaded to receive a screw-threaded portion of a valve-stem 41. A valve 42 borne by stem 41 is movable toward and away from seat 43 in passage 40 in order to control the flow of gas through said passage 40. Apertures 44 in stem 31 communicate with passage 40 and open into chamber 45 within member 20. A pipe 46 that is connected to member 20 communicates with chamber 45 and conveys the gas, which enters said chamber, to a pipe (not shown in the drawings) that leads to the lamps of the automobile. When stem 41 is turned so that valve 42 moves away from seat 43, the gas that enters passage 40 from passage 17 flows through apertures 44 into chamber 45 from which it passes through pipe 46.

A cap 47 borne by the upper end of stem 31 encircles stem 41 and causes packing ring 48 to press packing 49 into stuffing-box 50 in said stem 31 in order to prevent the gas from leaking out of passage 40. Stem 41 is provided with a lock-nut 51 by means of which said stem is locked from being rotated in order to maintain a uniform flow of the gas through apertures 44. A handwheel 52 borne by the upper end of stem 41 affords a means for turning same.

The operation of the valve is as follows: When hand-wheel 37 is turned in the direction to cause stem 31 to move toward stem 14, said stem 31 causes stem 14 to push valve 10 away from seat 9, whereby the gas in chamber 6 passes into chamber 19 and then flows through apertures 18 into passage 17. After the valve 10 is moved away from seat 9 the stem 31 is locked by means of lock-nut 36. Hand-wheel 52 is then turned to cause stem 41 to draw valve 42 away from seat 43, whereby the gas that enters passage 40 from passage 17 passes through apertures 44 into chamber 45 from which it passes through pipe 46. Lock-nut 51 is then tightened to prevent stem 41 from being rotated and to maintain a uniform flow of the gas through pipe 46.

In order to cut off the flow of gas through pipe 46, either the hand-wheel 52 can be turned to cause valve 42 to engage seat 43, or hand-wheel 37 can be turned to draw stem 31 away from stem 14, whereby spring 11 forces valve 10 against seat 9. By turning hand-wheel 27 so that stud 26 moves out of depression 28, the yoke 22 and member 20 can be removed from casing 4.

I claim:

1. In a valve, the combination of a casing, a valve therein, a member engaging the casing, means to hold said member in connection with said casing, a hollow stem borne by said member for operating said valve, a valve within said stem, means for operating said last-mentioned valve, and locking means for said operating means.

2. In a valve, the combination of a casing, a valve therein, a member engaging the casing, means to hold said member in connection with said casing, a hollow stem borne by said member for operating said valve, locking means for said stem, a valve within said stem, a revoluble member adapted to operate said last-mentioned valve, and locking means for said revoluble member.

3. In a valve, the combination of a casing, a valve therein, a member engaging the casing and having a chamber, means to hold said member in connection with said casing, a hollow stem borne by said member and having apertures communicating with said chamber, a valve within said stem, and a revoluble member borne by said stem for operating said last-mentioned valve, said stem operating said first-mentioned valve.

4. In a valve, a casing having a recess formed in its upper end, a valve in the casing, a member formed with a projecting sleeve which is received in said recess, a hollow stem carried by said member and projecting beyond the outer end thereof and having its lower end for engagement with the valve, a valve seat formed on the interior of the stem, a valve on the interior of the stem to engage in said seat, means to operate the last named valve, and means to operate the stem to unseat the first named valve, said stem having an outlet to permit the discharge of the fluid from the stem.

5. In a valve, a casing, a valve therein, a member secured to the casing, a rotatable hollow stem threaded into said member and having one end thereof engaged with said valve, a valve on the interior of the stem, rotatable means to operate said second valve, means to permit the discharge of the fluid from the stem and means to operate the stem to effect unseating of the first valve.

6. In a valve, a casing, a valve therein, a member secured to the casing, turnable means carried by the member to actuate said valve, a valve in said means, means to actuate said second valve, said turnable means having an outlet to permit the discharge of the fluid from said turnable means, and means to lock the turnable means in any predetermined position.

7. In a valve, a casing, a valve therein, a member for engagement with the casing, said member being formed with a chamber and a partially threaded bore which communicates with the chamber, a hollow stem threaded into engagement with the threaded portion of the bore having its lower end for engagement with said valve and having apertures which lead into said chamber, means for locking said stem in any position to which it may be turned, said stem having a valve seat, and a threaded part on its interior, a valve stem in threaded engagement with said last named threaded part of the stem interior and carrying a valve on its lower end to engage said valve seat on the stem interior, means whereby the hollow stem may be rotated, means whereby said valve stem may be rotated, and means to lock the valve stem in any position to which it may be rotated.

8. In a valve, a casing, a valve therein, a member engaging the casing, a rotatable hollow stem in the member having a valve seat on its interior and having its inner end for engagement with said valve, and a rotatable valve in said stem to engage said valve seat on the interior thereof.

9. In a valve, a casing, a valve therein, a member engaging the casing, a rotatable hollow stem in the member having a valve seat on its interior and having its inner end for engagement with said valve, and a rotatable valve in said stem to engage said valve seat on the interior thereof, means on the stem engaging said member to lock the stem against movement, and means on the rotatable valve engaging the stem to lock the valve against movement with respect to the stem.

10. In a valve, a casing, a valve therein, a member engaged with the casing, a rotatable hollow stem having one end threaded in said member to engage said valve and having a hand wheel on its opposite end, said stem having a valve seat on its interior and a threaded part, a valve to engage said valve seat having a stem which is in threaded engagement with the threaded part of the hollow stem and whose outer end extends beyond the hand wheel of the hollow stem, and a hand wheel on said valve stem located beyond said hand wheel of the hollow stem.

In testimony whereof I have affixed my signature in presence of two witnesses.

CLARENCE DE WITT LUKENS.

Witnesses:
GLADYS WALTON,
DAVID LEON SOLOMAN.